(No Model.) 5 Sheets—Sheet 1.
S. B. DOVER.
Combined Seed Planter, Guano Distributer, Cultivator, and Cotton Chopper.
No. 235,219. Patented Dec. 7, 1880.
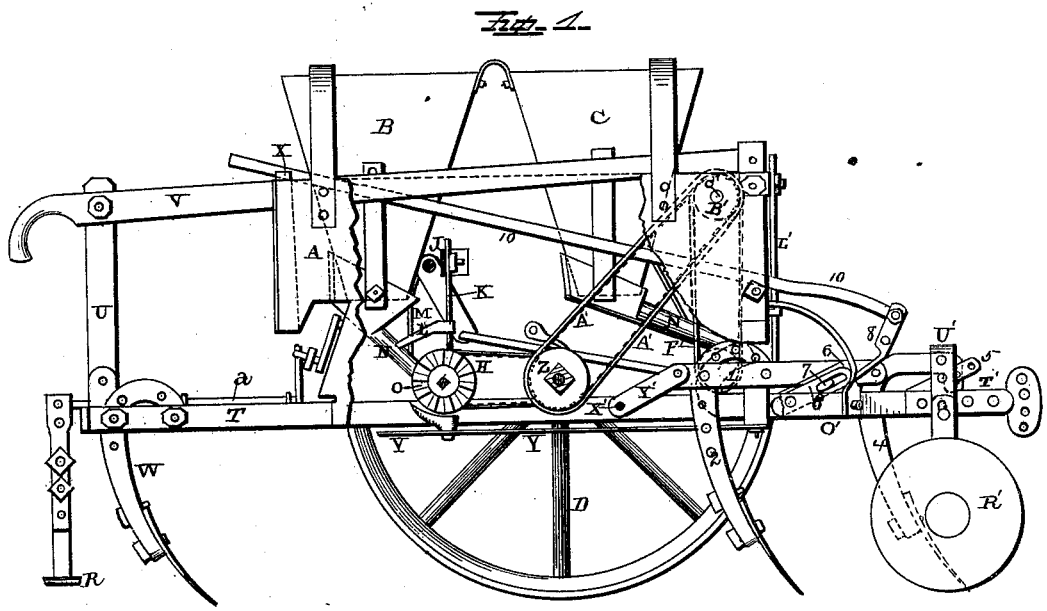
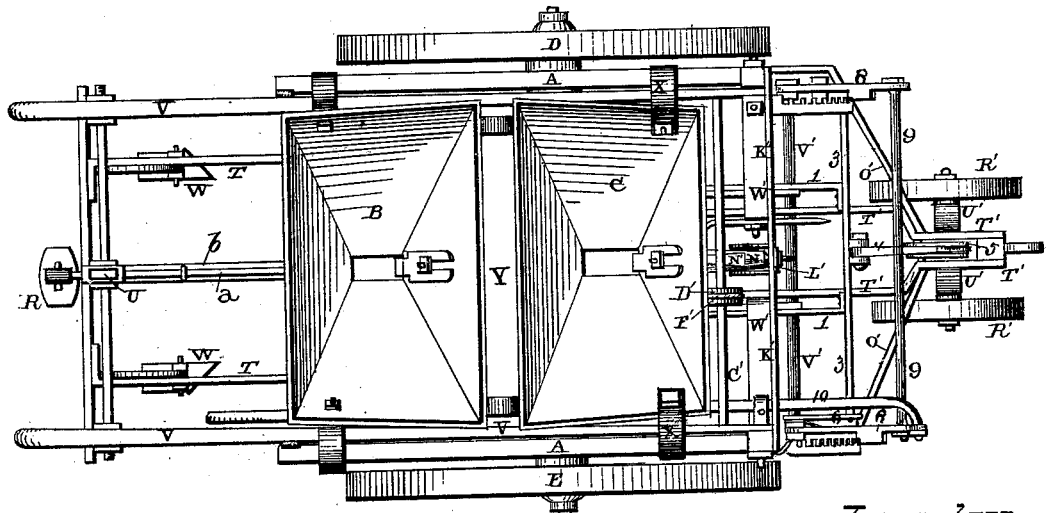
Witnesses
Wm. W. Mortimer
Will H. Kern
Inventor
S. B. Dover,
per
F. A. Lehmann,
atty.

(No Model.) 5 Sheets—Sheet 2.
S. B. DOVER.
Combined Seed Planter, Guano Distributer, Cultivator, and Cotton Chopper.
No. 235,219. Patented Dec. 7, 1880.
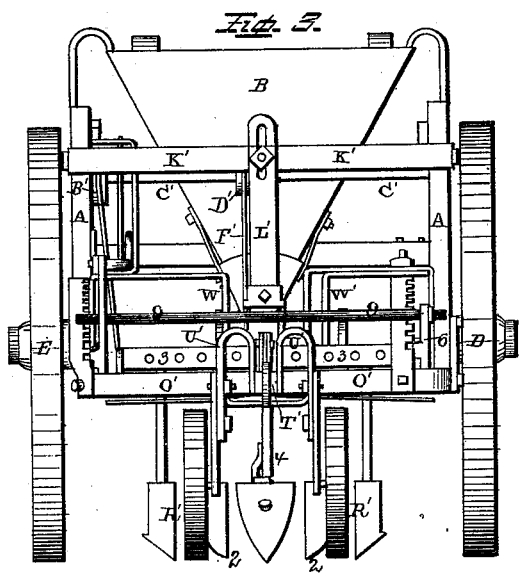
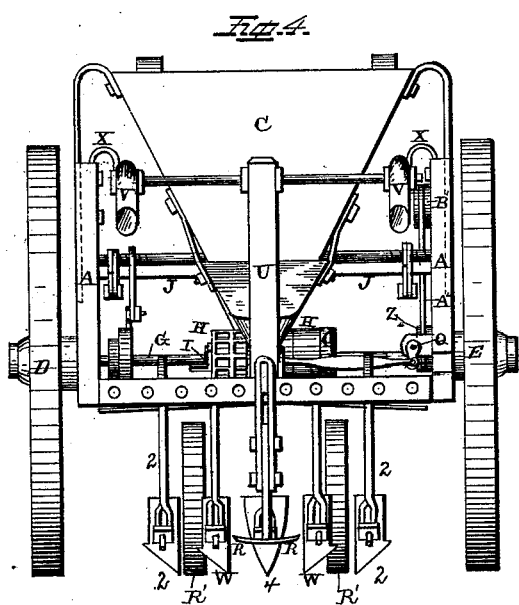
Witnesses
Wm. W. Mortimer
Chas. H. Isham
Inventor
S. B. Dover,
per
F. A. Lehmann,
att'y (No Model.) 5 Sheets—Sheet 3.
S. B. DOVER.
Combined Seed Planter, Guano Distributer, Cultivator, and Cotton Chopper.
No. 235,219. Patented Dec. 7, 1880.
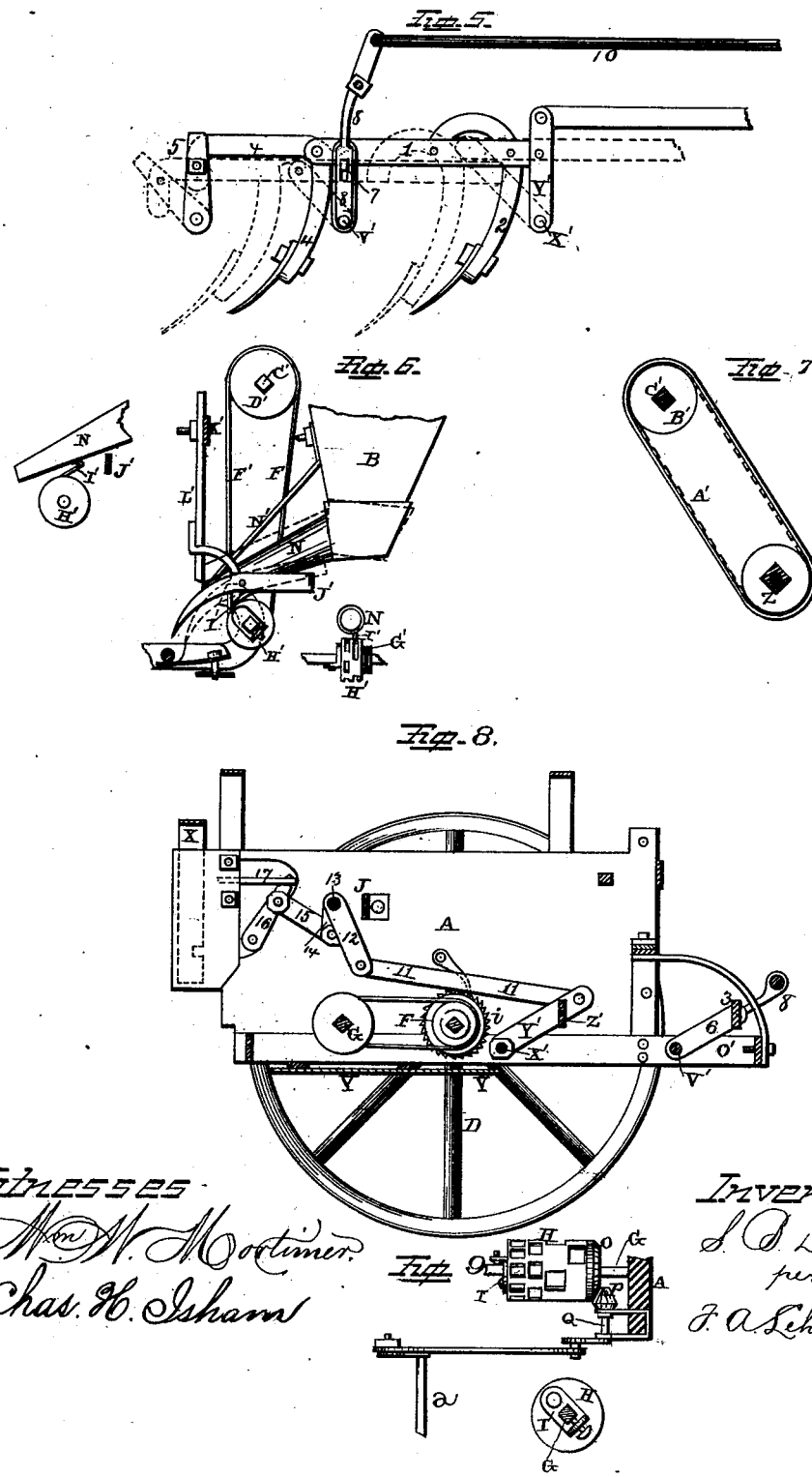

(No Model.)   5 Sheets—Sheet 4.
S. B. DOVER.
Combined Seed Planter, Guano Distributer, Cultivator, and Cotton Chopper.
No. 235,219.   Patented Dec. 7, 1880.
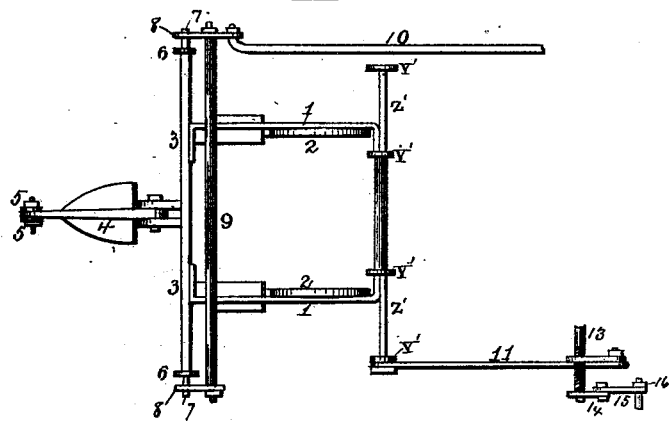
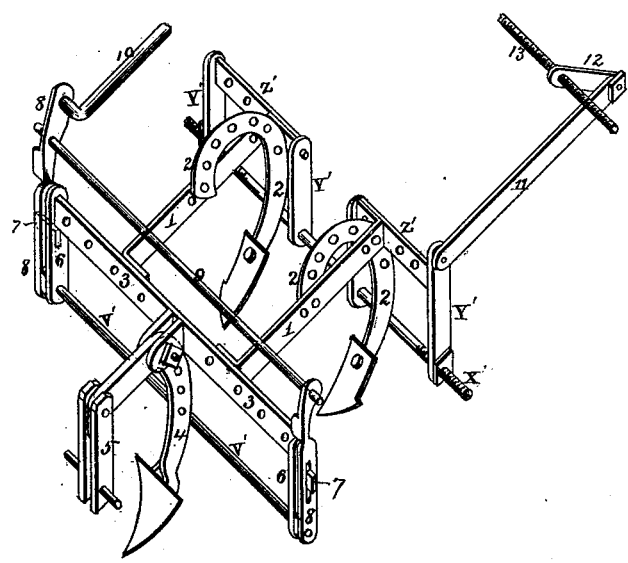
Witnesses
Wm W. Mortimer
A. C. Kirkadden
Inventor
S. B. Dover
per
F. A. Lehmann,
atty.

(No Model.)  5 Sheets—Sheet 5.
S. B. DOVER.
Combined Seed Planter, Guano Distributer, Cultivator, and Cotton Chopper.
No. 235,219. Patented Dec. 7, 1880.
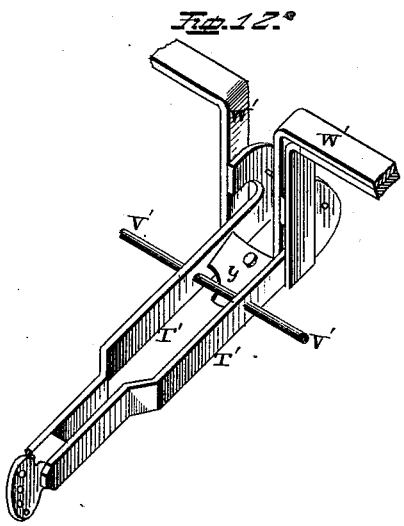

UNITED STATES PATENT OFFICE.

SAMUEL B. DOVER, OF SONORA, GEORGIA.

COMBINED SEED-PLANTER, GUANO-DISTRIBUTER, CULTIVATOR, AND COTTON-CHOPPER.

SPECIFICATION forming part of Letters Patent No. 235,219, dated December 7, 1880.

Application filed September 30, 1880. (No model.)

*To all whom it may concern:*

Be it known that I, SAMUEL B. DOVER, of Sonora, in the county of Gordon and State of Georgia, have invented certain new and useful Improvements in Combined Seed-Planter, Guano-Distributer, Cultivator, and Cotton-Chopper; and I do hereby declare the following to be a full, clear, and exact description of the invention, such as will enable others skilled in the art to which it pertains to make and use it, reference being had to the accompanying drawings, which form part of this specification.

My invention relates to an improvement in combined seed-planter, guano-distributer, cultivator, and cotton-chopper; and it consists in the arrangement and combination of parts, which will be more fully described hereinafter, whereby the machine can be applied to either plowing or cultivating the soil, distributing guano or fertilizer, sowing seed, or chopping cotton, as may be desired.

The object of my invention is to combine in a single machine the necessary parts for doing all the work that is necessary in the planting and cultivation of a crop of cotton, and thus avoid the necessity of having to buy a number of different machines for doing the different kinds of work.

Figure 1 is a side elevation of my invention with the side frame of the machine removed. Fig. 2 is a plan view of the same. Fig. 3 is a front view. Fig. 4 is a rear view. Figs. 5, 6, 7, 8, 9, 10, 11, and 12 are detail views.

A represents the frame of the machine, upon which is placed the hopper B for distributing guano, and the hopper C for holding the seed, and which frame is supported upon the two driving-wheels D E. The wheel D, on the left of the machine, is secured rigidly to the axle, so that when the axle revolves the pulley F, secured to it inside of the frame A, will, by means of its operating band, belt, or chain, operate the shaft G, upon which is secured the seed-cylinder H. Also secured to the axle, just inside of the pulley, is a ratchet-wheel, *i*, with which a dog that is fastened to the inner side of the frame engages, so as to prevent the axle from turning backward, and thereby turning the seed-cylinder backward at the same time. The pulleys upon the axle and the shaft G are made of different sizes, so that the operating belt, cord, or chain can be shifted from one size to another, so as to increase or decrease the speed at which the cylinder H shall be turned.

The seed-cylinder is secured to the axle by means of a plate, I, which is secured to one end of the cylinder, and which has an opening through it to pass over the shaft G. Just above the top of the shaft this plate I is bent at right angles, and a set-screw is passed through this bent portion of the plate, so as to bear against the top of the shaft, and thus secure this endwise-moving cylinder into any position into which it may be adjusted. This cylinder has a series of different-sized recesses or pockets made in its surface for the seed to drop into from the spout leading from the lower end of the hopper, and these recesses or pockets are made not only of different sizes, but different distances apart, according to the kind of seed to be planted and the distance which they are to be planted apart. By moving this cylinder endwise upon the shaft any one of these series of pockets may be brought under the lower end of the spout of the hopper. This adjustability upon its shaft of the cylinder, in contradistinction to a hopper which is adjusted back and forth over the cylinder, is a very great advantage, as the small dropping-cylinder can be much more readily adjusted back and forth than the large hopper, and the construction of the machine is simplified and cheapened accordingly.

Secured in between the sides of the frame A, and extending across under the seed-hopper, is a rod or plate, J, from which depends the slotted adjustable clearing device K, the lower end of which extends down and bears against the cylinder, so as to clear away any surplus of seed which may be dropped from the spout of the seed-hopper. Projecting from the opposite edges of this clearing device K are the curved arms L, and extending down from the front side of the hopper, and extending down in between the two arms L, is the spring M, which can be adjusted vertically by means of a series of holes made through the front of the hopper. The two arms L serve to keep the clearing device and the spout in line with each other, and the spring M, bearing down upon the top of the spout, serves to keep the spout in contact with the seed-cylinder.

The spouts N, leading from the two hoppers, are suspended below the lower ends of the hoppers by means of springs or bands, which are made adjustable up and down, either by holes through the bands themselves or by means of holes which are made through the hoppers. These spouts, being suspended upon elastic bands or straps, will be made to constantly vibrate as the machine is drawn along over the field, and thus will keep the seed or guano constantly flowing from them, and will never allow them to clog. Inside of each hopper is placed a vertically-adjustable slide, by means of which the flow of seed or guano from the hoppers can be increased or decreased, as may be desired.

The endwise-moving seed-cylinder also performs the function of operating the cotton-chopper when not used for planting the seed. Upon the end of the cylinder is made the teeth O, which, when the cylinder is moved over toward the side of the frame, engages with the small beveled pinion P upon the front end of the shaft Q, which shaft Q has a crank formed upon its rear end, and through which the chopping-hoe R is vibrated back and forth. This hoe is secured to the rear end of the shaft $a$, which rests upon the central beam $b$ of the pivoted frame T, which extends from the rear end of the frame A, and is connected by means of the rod U with the rear ends of the handles V. The front and the rear ends of the frame T are provided with a series of perforations, by means of which the two side bars, to which the plows W are secured, can be adjusted laterally, so as to move the plows nearer to or farther from each other. These plows or covering-shovels have perforated curved standards, as shown, and by means of which standards and the perforations in the side bars of the frame the plows can be adjusted up and down, so as to run shallow or deep, as may be desired.

The handles V are pivoted at the extreme front corners of the frame A, and are held steady and true in their movements by means of the curved guides X, which are secured to their outer sides and project down into recesses or pockets made in the rear ends of the frame A. As the frame T is secured to these handles by means of the connecting-rods, and as the front end of the frame T is pivoted in the rear lower corner of the frame A, when the handles are raised or lowered the frame T is raised or lowered with them.

Secured to the under side of the frame by means of suitable projections, which extend up into the frame and are held in place by means of set-screws, is the plate Y, which has a small hopper formed upon its top, and into which the seed fall from the endwise-moving seed-cylinder, and from this small hopper they drop to the ground.

The driving-wheel E upon the right side of the frame is loosely attached to the axle, so as to run idly thereon, and has its hub to project through the side of the frame, and forms a pulley, Z, from which extends a cord, chain, or band, A', up over the pulley B', upon the shaft C', which is journaled in the upper front corner of the frame A. Near the center of this shaft C' is a second pulley, D', and from which there extends a band, cord, or chain, F', over the pulley G', upon the side of a short cylinder, H', having a series of pockets or recesses, which are placed different distances apart, and which revolves under the spout which leads from the bottom of the front hopper. This small cylinder is adjustable back and forth upon its shaft by means of a similar device which holds the endwise-moving seed-cylinder in position. On the under side of this spout, just over the top of the endwise-moving cylinder H', is secured a bent spring, I', and which bears down upon the top of the recessed cylinder H', and which, in passing from one pocket to the other as the cylinder revolves, causes a vibrating movement to the spout, so as to shake out the guano. When the spring catches in the pockets which are closest together a more rapid motion is given to the spout.

When the pivoted bar J', having its front end curved, as shown in Fig. 6, is depressed at its lower end by means of the cross-bar 3, the rear end of the bar raises the spout N upward, so that the spring will not bear upon the cylinder, and so that the front end of the spout will be closed by the cut-off L'.

Secured across the front end of the frame is a cross-bar, K', and extending downward from the cross-bar is the plate L', which serves to cut off the flow of guano from the front end of the spout which leads from the guano-hopper. This cut-off L' is provided with two curved arms, which extend backward upon each side of the spout and hold it and the cut-off in such relative arrangement that the cut-off is always sure to act. Bearing against the top of this spout is a flat spring, N', which serves to force the front end of the spout downward away from the cut-off, when the bar J' leaves the spout free to move. When the guano escapes from the front end of the spout it drops upon the small receiver $y$, and from this receiver it is dropped to the earth upon the center of the row.

Secured to the lower front corners of the frame A are the two curved braces O', which have their front ends secured to the rigid frame T', which has the clevis secured to its front end. From each side, near the front end of this frame T', is secured the curved support U', and to each of these supports is adjustably secured the small wheel R', which can be adjusted up and down at will. These wheels steady and balance the machine in front, and also regulate the depth to which the furrows shall be made.

The rear end of the frame T' is supported by the rod V', which passes through it, and by the U-shaped frame W', which is secured to the inside of the frame A, and to which the U-shaped frame (the frame T') is secured in two different places by having its rear end curved upward, as shown. This curved-up end of the frame T' serves as the bearing for the shaft upon which the seed-cylinder is placed.

Secured in suitable bearings at the lower edges of the center of the frame A is the screw-rod X', and upon which are adjustably secured the flat bars Y', which have their upper ends connected together by means of the perforated pivoted bars Z', and to which bars Z' are secured the horizontal bars 1, to which the two plow-standards 2 are secured. The front ends of these two horizontal rods 1 are secured to the perforated cross-bar 3, which is provided with a series of perforations corresponding to the perforations in the bars Z', and whereby the bars 1 can be adjusted in and out, so as to make the plow-standards 2 nearer together or farther apart, as may be desired. The two cross-bars Z' and the cross-bar 3 are all pivoted in their bearings, so that they can have a slight rocking motion as they are moved back and forth, and thus always keep in a vertical position. To the front side of the bar 3 is pivoted the front plow-standard, 4, which standard has its front end to project forward, and is pivoted to the uprights 5, which are pivoted in the frame T'. The bearings of the pivoted rod 3 are secured at their lower ends upon the rod V', which passes through the rear portion of the frame T', and each one of these bearings 6 is provided with a projection, 7, which extends outward through the slot in the levers 8, which are also pivoted upon the rod V', and connected together at their upper end by the rod 9.

One of the flat rods Y' has secured to its upper end the rod 11, which extends backward toward the rear end of the frame A, and which rod 11 has its rear end secured to the hanger 12, that is secured to the shaft 13, which extends across the inside of the frame A. At each end of this shaft 13 is secured the arm or lever 14, which has secured to its lower end a connecting-rod, 15, which rod is connected at its rear end to a pivoted lever, 16. Each one of these levers 16 is pivoted at its lower end to the inside of the frame, and has loosely attached to its upper end a locking-rod, 17, which extends backward and catches in a notch in the curved supports of the handles, which supports extend down into pockets or recesses in the rear end of the frame A, as already described. When these locking-rods are moved backward they lock the handles in position so that they cannot be moved.

Through one of the levers 8 is secured the operating-lever 10, which extends back to the rear end of the frame, so as to be readily operated by hand. By forcing this lever 10 back and forth the pivoted frame in which the plows are secured is moved back and forth, so as to raise and lower the plows. As each one of the plow-standards is provided with a series of holes they can be adjusted to run at any desired depth. When this lever 10 is moved forward for the purpose of lowering the plows the locking-rods 17 are moved forward so as to let the handles be freely moved up and down.

In order to prevent the belts which drive the seed-cylinder H or the shaft C' from slipping while the machine is in operation, they are provided with projections, as shown in Figs. 1 and 7, and which catch in recesses made in the peripheries of the pulleys.

Instead of the double hoe shown in Figs. 1, 2, and 4 for chopping the cotton, a rake-shaped tool may be used, which will both cut out the plants and loosen up the ground.

Having thus described my invention, I claim—

1. The seed-cylinder H, made movable endwise on its shaft, and provided with teeth O at one end, and a holding device for securing it in place on the shaft, whereby the cylinder is adapted either for planting seed or operating the cotton-chopper, substantially as set forth.

2. In a seed-planter, the combination of the pivoted frame T, having secured to it the covering-plows W, with the handles V, which are pivoted to the frame, and provided with the supports X, and a locking mechanism consisting of the parts Y', 11, 12, 13, 14, 15, 16, and 17, whereby the frame T is supported above the ground, substantially as specified.

3. In a seed-machine, the combination of the guano-hopper B, provided with a spout, N, spring I', and a lever, J', for raising the spout upward, with the cut-off L', substantially as shown.

4. The combination, with the operating-lever 10, cross-rod 9, levers 8, rod V', pivoted rods 6, connected to the levers, cross-bar 3, bars 1 Z' Y', cross-rod X', and the plows 2 4, substantially as described.

In testimony that I claim the foregoing I have hereunto set my hand this 25th day of August, 1880.

SAMUEL B. DOVER.

Witnesses:
JOHN A. PAYNE,
JACOB F. DEAL.